(12) United States Patent
Jang (10) Patent No.: US 10,915,473 B2
(45) Date of Patent: Feb. 9, 2021

(54) DATA STORAGE DEVICE

(71) Applicant: SK hynix Inc., Gyeonggi-do (KR)

(72) Inventor: Chae Kyu Jang, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 51 days.

(21) Appl. No.: 15/812,110

(22) Filed: Nov. 14, 2017

(65) Prior Publication Data

US 2018/0293190 A1    Oct. 11, 2018

(30) Foreign Application Priority Data

Apr. 6, 2017   (KR) .......................... 10-2017-0044827

(51) Int. Cl.
*G06F 13/16*       (2006.01)
(52) U.S. Cl.
CPC ...... *G06F 13/1689* (2013.01); *G06F 13/1657* (2013.01); *G06F 13/1673* (2013.01)
(58) Field of Classification Search
CPC combination set(s) only.
See application file for complete search history.

(56) References Cited

U.S. PATENT DOCUMENTS

| | | | | |
|---|---|---|---|---|
| 7,555,625 B2* | 6/2009 | Nam | .................. | G06F 13/4234 |
| | | | | 365/233.1 |
| 2011/0264851 A1* | 10/2011 | Jeon | .................. | G06F 13/1689 |
| | | | | 711/103 |
| 2019/0205268 A1* | 7/2019 | Hampel | ............... | G11C 7/1012 |

FOREIGN PATENT DOCUMENTS

KR     1020020067415     8/2002

* cited by examiner

*Primary Examiner* — Yong J Choe
(74) *Attorney, Agent, or Firm* — IP & T Group LLP (57) ABSTRACT

A data storage device may include: first and second memory devices suitable for sharing an input clock signal line and at least one I/O signal line; and a controller suitable for enabling the first and second memory devices at the same time, and controlling the first and second memory devices by transmitting an input clock signal to the input clock signal line and transmitting an input signal synchronized with the input clock signal to the I/O signal line.

16 Claims, 4 Drawing Sheets

DATA STORAGE DEVICE

CROSS-REFERENCES TO RELATED APPLICATION

The present application claims priority under 35 U.S.C. § 119(a) to Korean application number 10-2017-0044827, filed on. Apr. 6, 2017, in the Korean Intellectual Property Office, which is incorporated herein by reference in its entirety.

BACKGROUND

1. Technical Field

Various embodiments generally relate to a data storage device including a memory device.

2. Related Art

Data storage devices store data provided by an external device in response to a write request. Data storage devices may also provide stored data to an external device in response to a read request. Examples of external devices that use data storage devices include computers, digital cameras, cellular phones and the like. Data storage devices may be embedded in an external device during manufacturing of the external devices or may be fabricated separately and then connected afterwards to an external device.

SUMMARY

In an embodiment, a data storage device may include: first and second memory devices suitable for sharing an input clock signal line and at least one I/O signal line; and a controller suitable for enabling the first: and second memory devices at the same time, and controlling the first and second memory devices by transmitting an input clock signal to the input clock signal line and transmitting an input signal synchronized with the input clock signal to the I/O signal line.

In an embodiment, a data storage device may include: first and second memory devices suitable for sharing an enable signal line, an input clock signal line and at least one I/O signal line; and a 1a controller suitable for transmitting an input clock signal to the input clock signal line and transmitting an input signal synchronized with the input clock signal to the I/O signal line, after transmitting an enable signal to the enable signal line. The first and second memory devices may selectively receive the input signal from the I/O signal line.

In an embodiment, a data storage device may include: first and second memory devices suitable for sharing an output clock signal line and at least one I/O signal line; and a controller suitable for enabling the first and second memory devices at the same time, and controlling the first and second memory devices by transmitting an output clock signal to the output clock signal line. The first and second memory devices may transmit an output signal to the controller through the I/O signal line in response to different direction edges of the output clock signal.

BRIEF DESCRIPTION OF THE DRAWINGS

The above and other features and advantages of the present invention will become more apparent to those skilled in the art to which the present invention belongs by describing various embodiments thereof with reference to the attached drawings in which.

DETAILED DESCRIPTION

Hereinafter, a data storage device and an operating method thereof according to the present invention will be described with reference to the accompanying drawings through exemplary embodiments of the present invention. The present invention may, however, be embodied in different forms and should not be construed as being limited to the embodiments set forth herein, Rather, these embodiments are provided to describe the present invention in detail to the extent that a person skilled in the art to which the invention pertains can enforce the technical concepts of the present invention.

It is to be understood that embodiments of the present invention are not limited to the particulars shown in the drawings, that the drawings are not necessarily to scale, and, in some instances, proportions may have been exaggerated in order to more clearly depict certain features of the invention. While particular terminology is used, it is to be appreciated that the terminology used is for describing particular embodiments only and is not intended to limit the scope of the present invention.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The phrase "at least one of . . . and . . . ," when used herein with a list of items, means a single item from the list or any combination of items in the list. For example, "at least one of A, B, and C" means, only A, or only B, or only C, or any combination of A, B, and C.

The term "or" as used herein means either one of two or more alternatives but not both nor any combinations thereof.

As used herein, singular forms are intended to include the plural forms as well unless the context clearly indicates otherwise. It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, an element also referred to as a feature described in connection with one embodiment may be used singly or in combination with other elements of another embodiment, unless specifically indicated otherwise.

Hereinafter, the various embodiments of the present invention will be described in detail with reference to the attached drawings.

Figure 1:
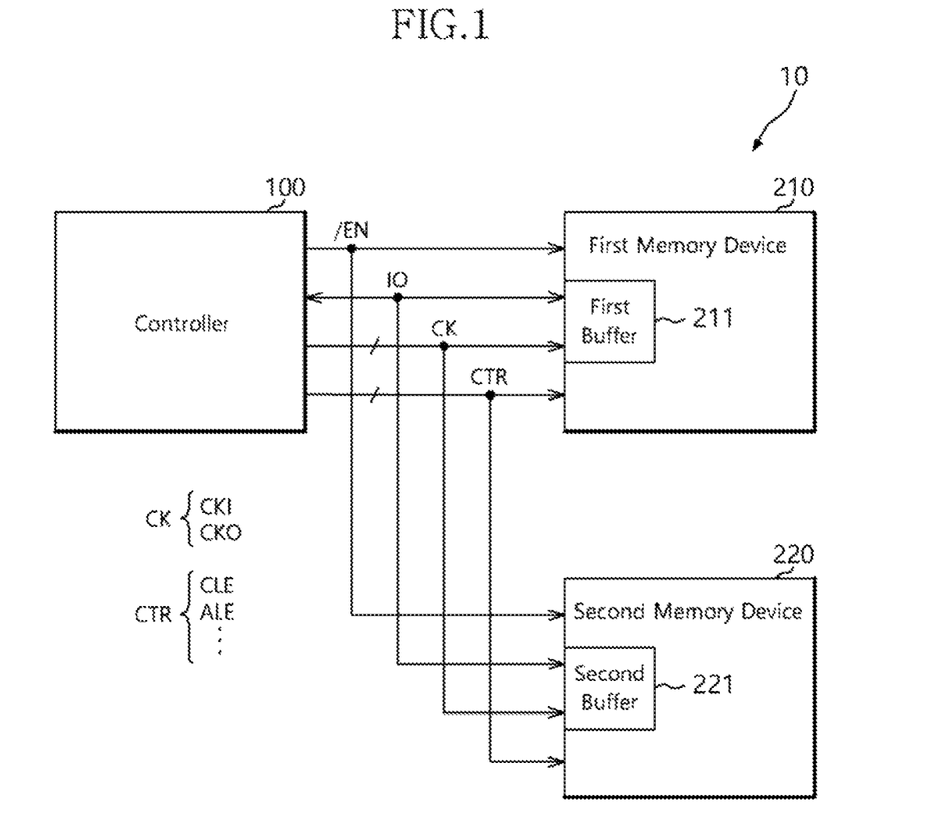
FIG. 1 is a block diagram illustrating a data storage device including a controller operatively coupled to first and second memory devices, in accordance with an embodiment of the present invention.

FIG. 1 is a block diagram illustrating a data storage device 10, in accordance with an embodiment of the present invention.

The data storage device 10 may be configured to store data provided from an external device in response to a write request of the external device. Also, the data storage device 10 may be configured to provide data stored therein to the external device in response to a read request of the external device.

The data storage device 10 may be configured as Personal Computer Memory Card International Association (PCM-CIA) card, Compact Flash (CF) card smart media card, memory stick, various multimedia cards (MMC, eMMC, RS-MMC and MMC-micro), Secure Digital (SD) card (SD, Mini-SD, Micro-SD), Universal Flash Storage (UFS), Solid State Drive (SSD) and the like.

The data storage device 10 may include a controller 100 operatively coupled to a first memory device 210 and a second memory device 220.

The controller 100 may store data in the first and second memory devices 210 and 220 in response to a write request transmitted from the external device, or read data stored in the first and second memory devices 210 and 220 and output the read data to the external device in response to a read request transmitted from the external device.

The controller 100 may be coupled to the first and second memory devices 210 and 220 through an enable signal line /EN, at least one I/O signal line IO, clock signal lines CK and control signal lines CTR. The clock signal lines CK may include an input clock signal line CKI and an output clock signal line CKO. The control signal lines CTR may include a command latch enable signal line CLE, an address latch enable signal line ALE and the like.

Hereafter, a method in which the controller 100 controls the first and second memory devices 210 and 220 through the above-described signal lines will be described. The controller 100 may transmit an enable signal to the first and second memory devices 210 and 220 through the enable signal line /EN in order to enable the first and second memory devices 210 and 220.

The controller 100 may transmit input signals such as a command, address and data to the first and second memory devices 210 and 220 through the I/O signal line IO. Also, the controller 100 may receive output signals such as data from the first and second memory devices 210 and 220 through the I/O signal line IO.

The controller 100 may transmit an input clock signal to the first and second memory devices 210 and 220 through the input clock signal line CKI in order to designate the timings at which the first and second memory devices 210 and 220 will receive input signals from the I/O signal line IO Also, the controller 100 may transmit an output clock signal to the first and second memory devices 210 and 220 through the output clock signal line CKO in order to designate the timings at which the first and second memory devices 210 and 220 will transmit output signals to the I/O signal line IO.

The controller 100 may transmit a command latch enable signal to the first and second memory devices 210 and 220 through the command latch enable signal line CLE such that the first and second memory devices 210 and 220 recognize an input signal transmitted to the I/O signal line IO as a command.

The controller 100 may transmit an address latch enable signal to the first and second memory devices 210 and 220 through the address latch enable signal line ALE such that the first and second memory devices 210 and 220 recognize signals transmitted to the I/O signal line IO as an address.

That is, while the first and second memory devices 210 and 220 are enabled in response to the enable signal which is transmitted through the enable signal line /EN, the controller 100 may transmit the above-described signals through the I/O signal line IO, the clock signal lines CK and the control signal lines CTR in order to control the first and second memory devices 210 and 220.

Since the first and second memory devices 210 and 220 share the enable signal line /EN, the first and second memory devices 210 and 220 may be enabled at the same time. Moreover, because the first and second memory devices 210 and 220 are enabled at the same time, there is a need for the first and second memory devices 210 and 220 to selectively receive input signals which are transmitted through the I/O signal line I/O because the first and second memory devices 210 and 220 share the same I/O signal line IO.

In accordance with the present embodiment, in connection with a write operation, the controller 100 may set the first and second memory devices 210 and 220 according to a method described later, such that the first and second memory devices 210 and 220 which are enabled at the same time do not simultaneously receive input signals from the I/O signal line IO, but selectively receive input signals which the respective first and second memory devices 210 and 220 are supposed to receive.

Specifically, the controller 100 may set the first and second memory devices 210 and 220 such that the first memory device 210 receives an input signal from the I/O signal line IO in response to a falling edge of the input clock signal transmitted through the input clock signal line CKI, and the second memory device 220 receives an input signal from the I/O signal line IO in response to a rising edge of the input clock signal transmitted through the input clock signal line CKI. Therefore, the first and second memory devices 210 and 220 may alternately receive input signals from the I/O signal line IO at the rising and falling edges of the input clock signal, respectively.

In the above-described simultaneous enable mode, the controller 100 may alternately align an input signal to be provided to the first memory device 210 and an input signal to be provided to the second memory device 200 with the falling and rising edges of the input clock signal, and transmit the aligned input signals to the I/O signal line IO alternately at the falling and rising edges of the input clock signal.

The controller 100 may alternately synchronize the input signal to be provided to the first memory device 210 and the input signal to be provided to the second memory device 220 with the edges of the input clock signal. The edges of the input clock signal may correspond to different directions toward the first and second memory devices 210 and 220. For example, the controller 100 may synchronize the input signal to be provided to the first memory device 210 at a falling edge of the input clock signal, and synchronize the input signal to be provided to the second memory device 220 at a rising edge of the input dock signal.

The controller 100 may alternately transmit the input signal to be provided to the first memory device 210 and the input signal to be provided to the second memory device 220 to the I/O signal line IO at a cycle equal to or less than the half cycle of the input clock signal.

Similarly, in connection with a read operation, the controller 100 may set the first and second memory devices 210 and 220 such that the first and second memory devices 210 and 220 which are enabled at the same time do not simultaneously transmit output signals to the I/O signal line IO, but alternately transmit output signals at a cycle equal to or less than a half cycle of the output dock signal. Specifically, the controller 100 may set the first and second memory devices 210 and 220 such that the first memory device 210 transmits an output signal to the I/O signal line IO in response to a falling edge of the output clock signal transmitted through the output clock signal line CKO, and the second memory device 220 transmits an output signal to the I/O signal line IO in response to a rising edge of the output clock signal transmitted through the output clock signal line CKO.

The first and second memory devices 210 and 220 operating in the above-described manner it will be referred to hereinafter, as the simultaneous enable mode. The controller 100 may transmit a simultaneous enable mode setting command to the first and second memory devices 210 and 220 in order to control the first and second memory devices 210 and 220 in the simultaneous enable mode.

In another embodiment, the controller 100 may transmit a wait mode setting command to any one of the first and second memory devices 210 and 220 in order to control the corresponding memory device into a wait mode. A wait mode is a mode in which one of the first and second memory devices ignores the signals which are transmitted through the I/O signal line 10, the clock signals CK and the control signals CTR, even though the memory device has received the enable signal through the enable signal line /EN.

Hence, between the first and second memory devices 210 and 220, one of the two memory devices, when it inters in the wait mode of operation upon receipt of the wait mode setting command can ignore the signals transmitted through the I/O signal line IO, the clock signal lines CK and the control signal lines CTR even though the memory device receives the enable signal through the enable signal line /EN.

At the same time that one of the two memory devices is in the wait mode, the other memory device which is not in the wait mode can operates in substantially the same manner as in the simultaneous enable mode. That is, the memory device which is not in the wait mode between the first and second memory devices 210 and 220 can receive an input signal from the I/O signal line IO in response to an edge of the input dock signal received from the input clock signal line CKI, the edge corresponding to a specific direction. Also, the memory device may transmit an output signal to the I/O signal line IO in response to an edge of the output clock signal received from the output clock signal line CKO, the edge corresponding to a specific direction.

In short, in order to alternately operate the first and second memory devices 210 and 220, the controller 100 may set one of the first and second memory devices 210 and 220 into the wait mode. Then, in order to cancel the wait mode, the controller 100 may transmit the simultaneous enable mode setting command to the memory device set which is in the wait mode.

In another embodiment, the controller 100 may change the settings such that each of the first and second memory devices 210 and 220 will respond to edges of the input clock signal and the output clock signal, the edges corresponding to a specific direction. For example, the controller 100 may change the setting in which the first memory device 210 responds to a falling edge of the input clock signal to the setting in which the first memory device 210 responds to a rising edge of the input clock signal.

In another embodiment, the controller 100 may set each of the first memory device 210 and the second memory device 220 to respond to edges having different directions for the input clock signal and the output dock signal. For example, the controller 100 may set the first memory device 210 to respond to a falling edge of the input clock signal and a rising edge of the output clock signal while at the same time, the controller 100 may set the second memory device 220 to respond to a rising edge of the input clock signal and a falling edge of the output clock signal.

In an embodiment, the controller 100 may operate in the simultaneous enable mode, when the first and second memory devices 210 and 220 need to perform the same type of operation. For example, the controller 100 may operate in the simultaneous enable mode, when performing a write operation on both of the first and second memory devices 210 and 220 or when performing a read operation on both of the first and second memory devices 210 and 220.

In an embodiment, in the simultaneous enable mode, the first and second memory devices 210 and 220 may store data transmitted from the controller 100, or read data stored therein and transmit the read data to the controller 100, according to control of the controller 100. The first and second memory devices 210 and 220 may be enabled at the same time in response to the enable signal received through the enable signal line /EN. The first and second memory devices 210 and 220 after being enabled at the same time may perform an internal operation in response to signals received from the I/O signal line IO, the clock signal lines CK and the control signal lines CTR in a simultaneous mode.

For example, according to the settings of the controller 100, the first and second memory devices 210 and 220 may be configured to receive, input signals from the I/O signal line IO in response to edges of the input clock signal received from the input clock signal line CKI, the edges corresponding to different directions, respectively.

As another example, according to the settings of the controller 100, the first and second memory devices 210 and 220 may be configured to transmit output signals to the I/O signal line IO in response to edges of the output clock signal received from the output clock signal line CKO, the edges corresponding to different directions, respectively. When operating in the simultaneous enabled mode, the first and second memory devices 210 and 220 may not simultaneously transmit the output signals to the I/O signal line IO, but may alternately transmit the output signals at a cycle equal to or less than a half cycle of the output clock signal.

According to an embodiment, the first memory device 210 may include a first buffer 211, and the second memory device 220 may include a second buffer 221. Each of the first and second buffers 211 and 221 may buffer an input signal received from the I/O signal line IO in response to the input clock signal received from the input clock signal line CKI, and may then buffer the received input signal in order to synchronize the buffered signal with an internal clock signal of the corresponding memory device between the first and second memory devices 210 and 220, and may then transmit the synchronized signal to an internal circuit of the corresponding memory device. Each of the first and second buffers 211 and 221 may be configured to receive an input signal from the I/O signal line IO in response to an edge of the input clock signal received from the input clock signal line CKI, the edge corresponding to a specific direction. Also, each of the first and second buffers 211 and 221 may be configured to transmit an output, signal to the I/O signal line IO in response to an edge of the output clock signal received from the output clock signal line CKO, the edge corresponding to a specific direction.

Each of the first and, second memory devices 210 and 220 may include a nonvolatile memory device or a volatile memory device. The nonvolatile memory device may include a flash memory device such as a NAND flash or a NOR flash, Ferroelectrics Random Access Memory (FeRAM), Phase-Change Random Access Memory (PCRAM), Magnetic Random Access Memory (MRAM) or Resistive Random Access Memory (ReRAM). The volatile memory device may include Static Random Access Memo (SRAM), Dynamic Random Access Memory (DRAM) and the like.

FIG. 1 illustrates that the data storage device 10 includes two memory devices or the first and second memory devices 210 and 220, but the number of memory devices included in the data storage device 10 is not limited thereto. In another embodiment, the data storage device 10 may include plural pairs of memory devices, for example, the first and second memory devices 210 and 220 sharing a plurality of signal lines.

Figure 2:
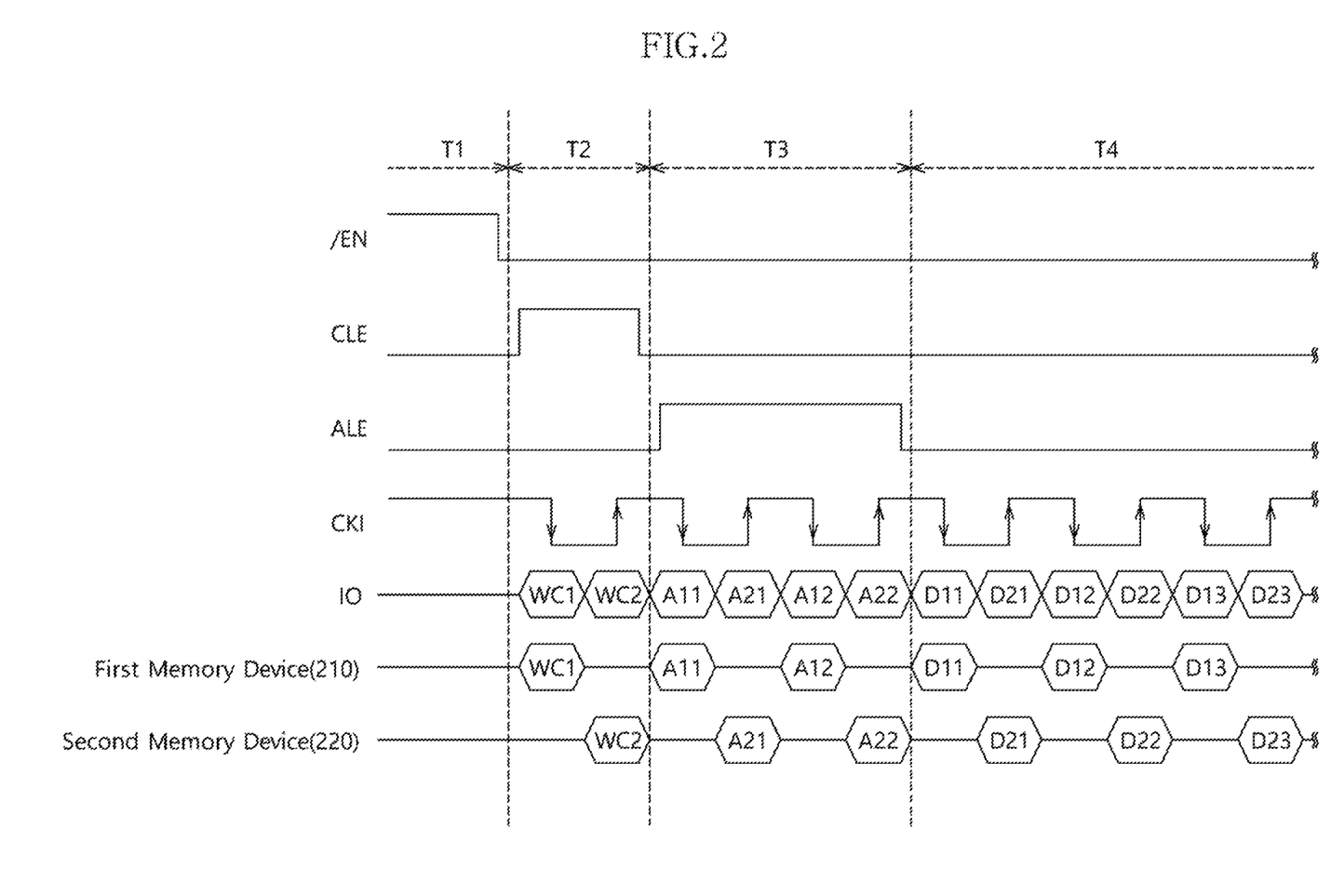
FIG. 2 is a waveform diagram illustrating the timing of the signals which the controller shown in FIG. 1 transmits to the first and second memory devices in a simultaneous enable mode.

FIG. 2 is a waveform diagram illustrating the timing of the signals which the controller 100 transmits to the first and second memory devices 210 and 220 in the simultaneous enable mode.

More specifically FIG. 2 illustrates the timing of the signals which the controller 100 transmits to the first and second memory devices 210 and 220 through the signal lines /EN CLE, ALE, CKI and IO, when a write operation is performed on the first and second memory devices 210 and 220.

The enable signal transmitted through the enable signal line /EN may be disabled to a logic high level or enabled to a logic low level, for example. The command latch enable signal transmitted to the command latch enable signal line CLE and the address latch enable signal transmitted to the address latch enable signal line ALE may be disabled to a logic low level or enabled to a logic high level, for example. The clock signal at the initial stage may be retained at a logic high level. In another embodiment, however, the clock signal may be retained at a logic low level. FIG. 2 describes an embodiment where the controller 100 sets the first memory device 210 to respond to falling edges of the input clock signal and sets the second memory device 220 to respond to rising edges of the input clock signal, as an example.

Referring to FIG. 2, the controller 100 may transmit the enable signal through the enable signal line /EN in a section T1. The first and second memory devices 210 and 220 may be enabled at the same time in response to the enable signal. For example, the enable signal may be enabled until the write operations of the first and second memory devices 210 and 220 are ended.

In a section T2, the controller 100 may transmit the command latch enable signal through the command latch enable signal line CLE such that the first and second memory devices 210 and 220 recognize an input signal to be transmitted through the I/O signal line IO as a command. Then, the controller 100 may transmit the input dock signal to the input clock signal line CKI and transmit write commands WC1 and WC2 synchronized with the input clock signal to the I/O signal line IO.

Specifically, the controller 100 may synchronize the write command WC1 to be provided to the first memory device 210 with a falling edge of the input clock signal, and synchronize the write command WC2 to be provided to the second memory device 220 with a rising edge of the input clock signal. The first memory device 210 may receive the write command WC1 from the I/O signal line IO in response to the falling edge of the input dock signal, and the second memory device 220 may receive the write command WC2 from the I/O signal line IO in response to the rising edge of the input clock signal.

In a section T3, the controller 100 may disable the command latch enable signal and transmit the enabled address latch enable signal through the address latch enable signal line ALE such that the first and second memory devices 210 and 220 recognize a signal to be transmitted through the I/O signal line IO as an address. The controller 100 may transmit addresses A11 to A22 synchronized with the input clock signal to the I/O signal line IO.

Specifically, the controller 100 may synchronize the addresses A11 and A12 to be provided to the first memory device 210 with falling edges of the input clock signal, and synchronize the addresses A21 and A22 to be provided to the second memory device 220 with rising edges of the input clock signal. The first memory device 210 may receive the addresses and A12 from the I/O signal line IO in response to the falling edges of the input clock signal, and the second memory device 220 may receive the addresses A21 and A22 from the I/O signal line IO in response to the rising edges of the input clock signal.

In a section T4, the controller 100 may keep the command latch enable signal disabled and may disable the address latch enable signal so that the first and second memory devices 210 and 220 may recognize input signals transmitted through the I/O signal line as data. The controller 100 may transmit data D11 to D23 synchronized with the input clock signal to the I/O signal line IO. Specifically, the controller 100 may synchronize the data D11 to D13 to be provided to the first memory device 210 with falling edges of the input dock signal, and synchronize the data D21 to D23 to be provided to the second memory device 220 with rising edges of the input clock signal. The first memory device 210 may receive the data D11 to D13 from the I/O signal line IO in response to the falling edges of the input clock signal, and the second memory device 220 may receive the data D21 to D23 from the I/O signal line IO in response to the rising edges of the input clock signal.

Figure 3:
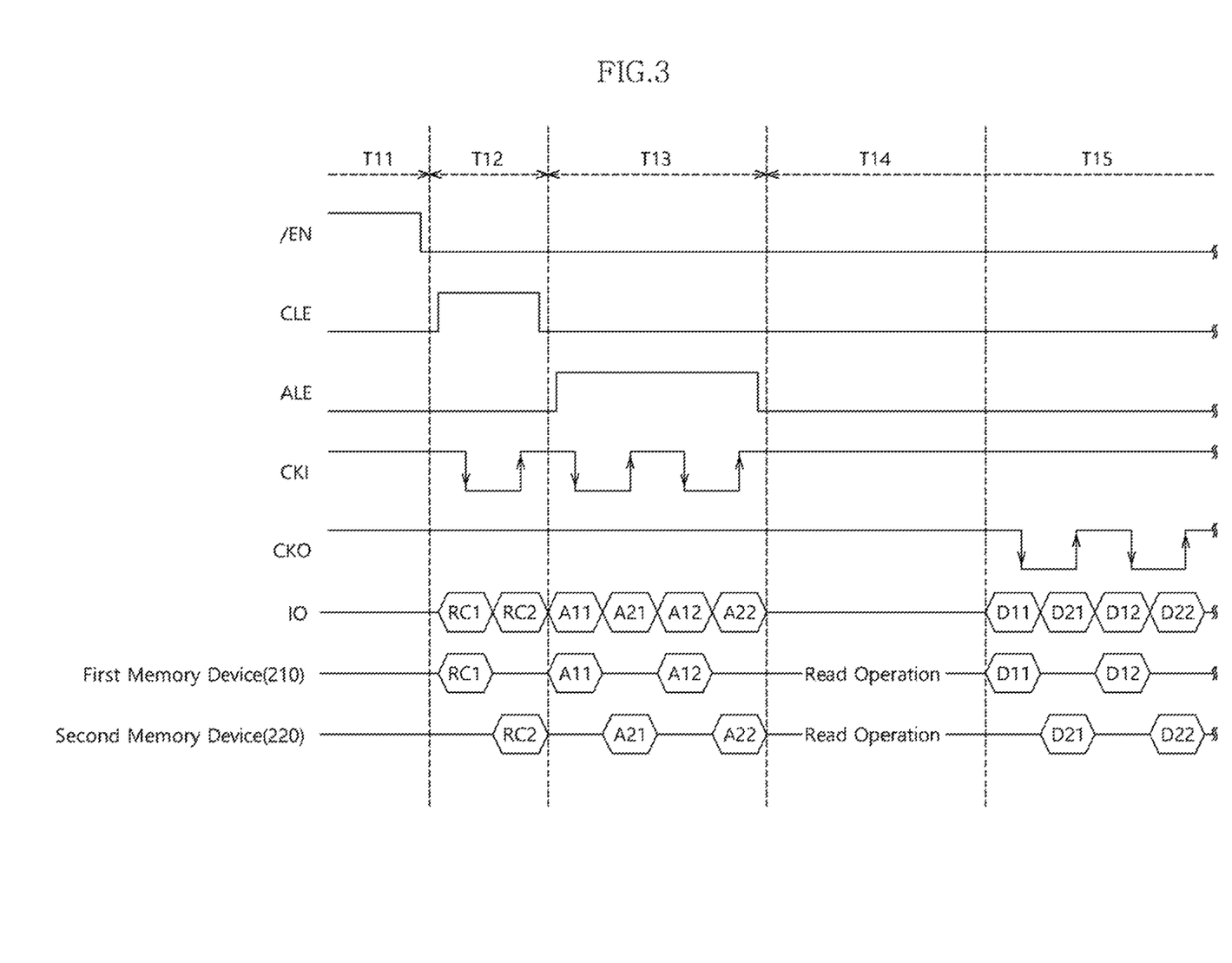
FIG. 3 is a waveform diagram illustrating the timing of the signals which the controller shown in FIG. 1 exchanges with the first and second memory devices in the simultaneous enable mode.

FIG. 3 is a waveform diagram illustrating the timing of the signals which the controller 100 exchanges with the first and second memory devices 210 and 220 in the simultaneous enable mode.

More specifically, FIG. 3 illustrates the signals which the controller 100 exchanges with the first and second memory devices 210 and 220 through the signal lines /EN, CLE, ALE, CKO and IO, when a read operation is performed on the first and second memory devices 210 and 220. FIG. 3 is described based on the supposition that the controller 100 sets the first memory device 210 to respond to falling edges of the input clock signal, and sets the second memory device 220 to respond to rising edges of the input clock signal.

Referring to FIG. 3, the controller 100 may transmit the enable signal through the enable signal line /EN in a section T11. The first and second memory devices 210 and 220 may be enabled at the same time in response to the enable signal. The enable signal may be enabled until the read operations of the first and second memory devices 210 and 220 are ended.

In a section T12, the controller 100 may transmit the command latch enable signal through the command latch enable signal line CLE such that the first and second memory devices 210 and 220 recognize an input signal to be transmitted through the I/O signal line IO as a command. Then, the controller 100 may transmit the input clock signal to the input clock signal line CKI, and transmit read commands RC1 and RC2 synchronized with the input clock signal to the I/O signal line IO.

Specifically, the controller 100 may synchronize the read command RC1 to be provided to the first memory device 210 with a falling edge of the input clock signal, and synchronize the read command RC2 to be provided to the second memory device 220 with a rising edge of the input clock signal. The first memory device 210 may receive the reed command RC1 from the I/O signal line IO response to the falling edge of the input clock signal, and the second memory device 220 may receive the read command RC2 from the I/O signal line IO in response to the rising edge of the input clock signal.

In a section T13, the controller 100 may disable the command latch enable signal and may transmit the address latch enable signal through the address latch enable signal line ALE such that the first and second memory devices 210 and 220 recognize an input signal to be transmitted through the I/O signal line IO as an address. The controller 100 may transmit addresses A11 to A22 synchronized with the input dock signal to the I/O signal line IO.

Specifically, the controller 100 may synchronize the addresses A11 and A12 to be provided to the first memory device 210 with falling edges of the input clock signal, and synchronize the addresses A21 and A22 to be provided to the second memory device 220 with rising edges of the input clock signal. The first memory device 210 may receive the addresses A11 and A12 from the I/O signal line IO in response to the falling edges of the input clock signal, and the second memory device 220 may receive the addresses A21 and A22 from the I/O signal line 10 in response to the rising edges of the input clock signal.

In a section T14, the controller 100 may keep the the command latch enable signal disables and disable the address latch enable signal so that the first and second memory devices 210 and 220 perform a read operation in response to the read commands RC1 and RC2.

In a section T15, the controller 100 may transmit the output clock signal to the output clock signal line CKO. The first and second memory devices 210 and 220 may transmit data D11 to D22 synchronized with the output clock signal to the I/O signal line IO. Specifically, the first memory device 210 may synchronize the data D11 and D12 to be transmitted to the controller 100 with falling edges of the output clock signal, and the second memory device 220 may synchronize the data D21 and D22 to be transmitted to the controller 100 with rising edges of the output dock signal.

Figure 4A:
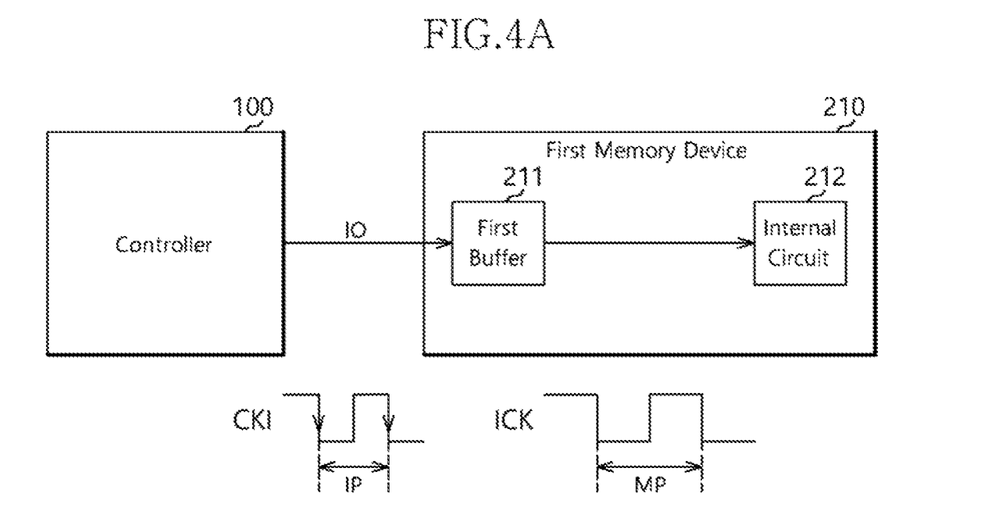
FIGS. 4A and 4B are diagrams illustrating an operation of a first buffer employed in the first memory device shown in FIG. 1, in accordance with an embodiment of the present invention.
Figure 4B:
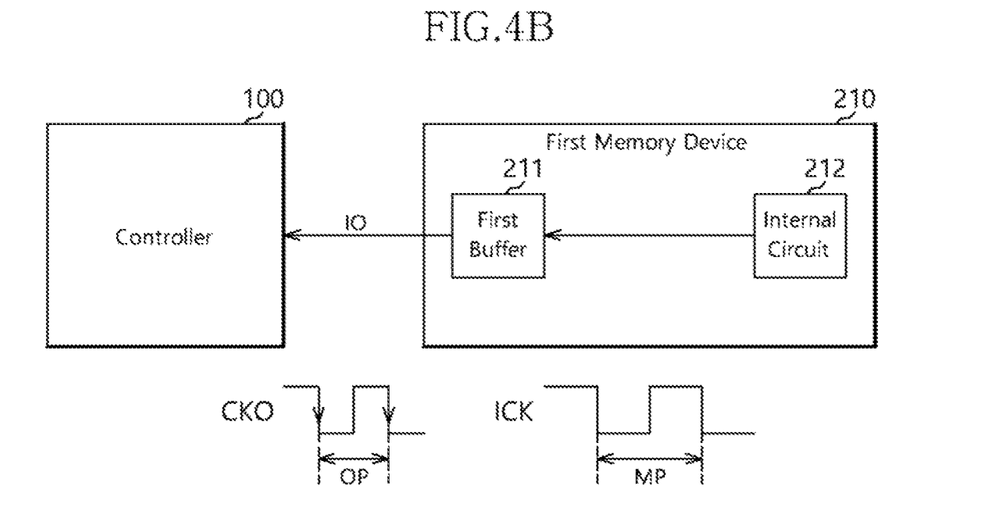

FIGS. 4A and 4B are diagrams for describing the operation of the first buffer 211 of FIG. 1. Only the operation of the first buffer 211 is described with reference to FIGS. 4A and 45, however, we note that the second buffer 221 operates in substantially the same manner as the first buffer 211.

Referring to FIG. 4A, the first buffer 211 may receive an input signal from the I/O signal line IO in response to a falling edge of the input clock signal received from the input clock signal line CKI. At this time, the period IP of the input clock signal may be shorter than the period MP of the internal clock signal ICK of the first memory device 210. Therefore, the first buffer 211 may buffer the input signal received from the I/O signal line IO, in order to synchronize the buffered signal With the internal clock signal ICK, and output the synchronized signal to an internal circuit 212 of the first memory device 210. For example, the first buffer 211 may output the synchronized signal to the internal circuit 212 at a falling edge of the internal clock signal ICK.

In another embodiment, when the period IP of the input clock signal received from the input clock signal line CKI is equal to the period MP of the internal clock signal ICK, the first buffer 211 need not buffer the input signal received from the I/O signal line IO, but can transmit the input signal to the internal circuit 212.

Referring to FIG. 4B, the first buffer 211 may transmit an output signal to the I/O signal line IO in response to a falling edge of the output dock signal received from the output clock signal line CKO. At this time, the period OP of the output dock signal may be shorter the period MP of the internal clock signal ICK of the first memory device 210. Thus, the first buffer 211 may receive an internal signal from the internal circuit 212 in the period MP of the internal dock signal ICK, and transmit the internal signal to the I/O signal line 10 in the period OP of the output clock signal.

In another embodiment, when the period OP of the output clock signal received from the output clock signal line CKO is equal to the period MP of the internal clock signal ICK, the first buffer 211 may not buffer the internal signal received from the internal circuit 212, but transmit the internal signal to the I/O signal line IO.

In accordance with the present embodiment, since the controller 100 can enable the first and second memory devices 210 and 220 at the same time and perform an operation such as a write operation, a read operation or the like in the simultaneous enable mode, the operating speed can be improved.

While various embodiments have been described above, it will be understood to those skilled in the art that the embodiments described herein are examples only of the present invention. Accordingly, the data storage device and the operating method thereof described herein should not be limited to the described embodiments. It will be apparent to those skilled in the art to which the present invention pertains that various other changes and modifications may be made without departing from the spirit and scope of the invention as defined in the following claims.

What is claimed is:

1. A data storage device comprising:
   first and second memory devices configured to share an input clock signal line and at least one input/output (I/O) signal line; and
   a controller configured to control the first and second memory devices by transmitting an input clock signal to the input clock signal line and transmitting an input signal synchronized with the input clock signal to the I/O signal line, while enabling both the first and second memory devices,
   wherein the first memory device includes a first buffer receiving the input signal from the I/O signal line in response to a falling edge of the input clock signal, and
   wherein the second memory device includes a second buffer receiving the input signal from the I/O signal line in response to a rising edge of the input clock signal.

2. The data storage device of claim 1,
   wherein the first and second memory devices further share an enable signal line, and
   wherein the controller enables both the first and second memory devices by transmitting an enable signal to the enable signal line.

3. The data storage device of claim 1, wherein the first and second memory devices receive the input signal from the I/O signal line in response to different direction edges of the input clock signal while both the first and second memory devices are enabled.

4. The data storage device of claim 1, wherein the controller alternately synchronizes an input signal to be provided to the first memory device and an input signal to be provided to the second memory device with different edges of the input clock signal.

5. The data storage device of claim 1,
   wherein each of the first and second buffers selectively receives the input signal from the I/O signal line in response to the input clock signal, and buffers the received input signal to synchronize the received input signal with an internal clock signal.

6. The data storage device of claim 1, wherein the first and second memory devices further share an output clock signal line, receive an output clock signal from the controller through the output clock signal line, and transmit an output signal synchronized with the output clock signal to the controller through the I/O signal line.

7. The data storage device of claim 6, wherein the first and second memory devices transmit the output signal to the I/O signal line in response to different direction edges of the output clock signal.

8. The data storage device of claim 6, wherein the controller sets the first and second memory devices, such that the first memory device transmits the output signal to the I/O signal line in response to a first-direction-edge of the output clock signal, and the second memory device transmits the output signal to the I/O signal line in response to a second-direction-edge of the output clock signal.

9. A data storage device comprising:
   first and second memory devices configured to share an enable signal line, an input clock signal line and at least one input/output (I/O) signal line; and
   a controller configured to transmit an input clock signal to the input clock signal line and transmit an input signal synchronized with the input clock signal to the I/O signal line, after transmitting an enable signal to the enable signal line,
   wherein the first memory device includes a first buffer receiving the input signal from the I/O signal line in response to a falling edge of the input clock signal, and
   wherein the second memory device includes a second buffer receiving the input signal from the I/O signal line in response to a rising edge of the input clock signal.

10. The data storage device of claim 9, wherein both the first and second memory devices are enabled at the same time in response to the enable signal.

11. The data storage device of claim 9, wherein the first and second memory devices receive the input signal from the I/O signal line in response to different direction edges of the input clock signal while both the first and second memory devices are enabled.

12. The data storage device of claim 9, wherein the controller alternately synchronizes an input signal to be provided to the first memory device and an input signal to be provided to the second memory device with edges of the input clock signal.

13. The data storage device of claim 9,
    wherein each of the first and second buffers selectively receives the input signal from the I/O signal line in response to the input clock signal, and buffers the received input signal to synchronize with an internal clock signal.

14. The data storage device of claim 9, wherein the first and second memory devices further share an output clock signal line, receive an output clock signal from the controller through the output clock signal line, and transmit an output signal synchronized with the output clock signal to the controller through the I/O signal line.

15. The data storage device of claim 14, wherein the first and second memory devices transmit the output signal to the I/O signal line in response to different direction edges of the output clock signal.

16. The data storage device of claim 14, wherein the controller sets the first and second memory devices, such that the first memory device transmits the output signal to the I/O signal line in response to a first-direction-edge of the output clock signal, and the second memory device transmits the output signal to the I/O signal line in response to a second-direction-edge of the output clock signal.

* * * * *